United States Patent
Yu et al.

(10) Patent No.: US 7,346,104 B2
(45) Date of Patent: Mar. 18, 2008

(54) ADAPTIVE RECEIVING SYSTEM AND METHOD FOR MIMO

(75) Inventors: Hee-Jung Yu, Daejeon (KR); Ji-Hoon Choi, Changnyung-gun (KR); Yong-Hoon Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 699 days.

(21) Appl. No.: 10/829,909

(22) Filed: Apr. 21, 2004

(65) Prior Publication Data

US 2005/0084028 A1    Apr. 21, 2005

(30) Foreign Application Priority Data

Oct. 21, 2003   (KR) ................. 10-2003-0073341

(51) Int. Cl.
*H04H 7/40* (2006.01)

(52) U.S. Cl. .............. 375/233; 375/232; 375/350; 708/323

(58) Field of Classification Search ........ 375/229–233, 375/346, 348–350; 708/300, 301, 305, 322, 708/323
See application file for complete search history.

(56) References Cited

U.S. PATENT DOCUMENTS

| 6,097,771 | A | 8/2000 | Foschini | |
| 7,072,392 | B2 * | 7/2006 | Xia et al. | 375/233 |
| 7,113,540 | B2 * | 9/2006 | Yousef et al. | 375/233 |

FOREIGN PATENT DOCUMENTS

KR    1998-0013075    4/1998

OTHER PUBLICATIONS

Korean Science Institute Doctoral Dissertation, "Adaptive equalizer based detecting method for multiple input mulptiple output system and I/Q imbalance compensating method." Ji-Hoon Choi, Nov. 12, 2002.

"Adaptive MIMO Decision Feedback Equalization for Receivers in Time-Varying Channels", J. Choi, et al., The 57th IEEE Semiannual Vehicular Technology Conference, Apr. 22-25, 2003 International Convention Center, Jeju, Korea, 6 pages.

"V-Blast: An Architecture for Realizing Very High Data Rates Over the Rich-Scattering Wireless Channel", P. Wolniansky, et al., 1998 IEEE, pp. 295-300.

"Layered Space-Time Architecture for Wireless Communication in a Fading Environment When Using Multi-Element Antennas", G. Foschini, Bell Labs Technical Journal, Autumn 1996, pp. 41-59.

"On the Relation Between V-Blast and the GDFE", G. Ginis, et al., 2001 IEEE, IEEE Communications Letters, vol. 5, No. 9, Sep. 2001, pp. 364-366.

(Continued)

*Primary Examiner*—Dac V. Ha
(74) *Attorney, Agent, or Firm*—Blakely Sokoloff Taylor & Zafman

(57) ABSTRACT

Disclosed is an adaptive receiving MIMO (multi input and multi output) system and method which decides a symbol detecting order so as to estimate the symbol having the minimum summation of weights of least square errors at the time of estimating the symbol for respective equalizers provided in parallel by the number of transmit antennas, and updates filter tap coefficients based on the RLS algorithm according to the detecting orders. Therefore, the filter tap coefficients are directly updated without tracking channels in the time-varying channel environment, and accordingly, detection performance very similar to those of the channel tracking and conventional V-BLAST scheme is provided with reduced complexity.

17 Claims, 7 Drawing Sheets

OTHER PUBLICATIONS

"Training-Based Channel Estimation for Continuous Flat Fading Blast", Q. Sun, et al., 2002 IEEE, pp. 325-329.

Blind Adaptive MIMO Decision Feedback Equalization using Givens Rotations, G. Ginis, et al, STARlab, Electrical Engineering Dept., Stanford University.

* cited by examiner

ADAPTIVE RECEIVING SYSTEM AND METHOD FOR MIMO

CROSS REFERENCE TO RELATED APPLICATION

This application claims priority to and the benefit of Korea Patent Application No. 2003-73341 filed on Oct. 21, 2003 in the Korean Intellectual Property Office, the content of which is incorporated herein by reference.

BACKGROUND OF THE INVENTION (a) Field of the Invention

The present invention relates to an adaptive receiving system and method for a MIMO (multi-input multi-output). More specifically, the present invention relates to a system and method for detecting transmit signals when channels are time-varying in wireless communication systems which use multiple transmit and receive antennas for high-speed data transmission.

(b) Description of the Related Art

As industries and personal lives using communication technologies have become activated, the importance of image and data transmission has grown while needs of high-speed data transmission have also increased. Therefore, techniques which increase data rates per bandwidth are required since the bandwidth for high-speed data transmission is insufficient.

MIMO systems for using multiple transmit and receive antennas and transmitting data in parallel have been aggressively studied so as to raise the data rates, and the V-BLAST (Vertical Bell Labs Layered Space Time) scheme has been developed as effective receivers for the MIMO systems.

The V-BLAST scheme increases bandwidth efficiency in proportion to the number of antennas when the number of antennas at a receiver is more than the number of antennas at a transmitter, and a channel is not varied for one packet duration.

However, the actual wireless mobile communication channels are varying, and computational complexity is abruptly increased when the V-BLAST scheme is applied to the channel-varying environment. That is, it is needed to estimate a MIMO channel and calculate a nulling vector corresponding to the MIMO channel in order to perform V-BLAST detection. Calculation of the nulling vector is performed once for each frame when the channel is not varying within the frame, and it is needed to calculate the nulling vector for each symbol when the channel is varying.

Methods for approximately updating the nulling vector and tracking the channel when using a V-BLAST receiver in the time-varying channel have been proposed so as to reduce the computational complexity.

A single frame is divided into several small blocks, the channel tracking is applied to each block, and the nulling vector is updated in the approximation method for updating the nulling vector and tracking the channels.

Since the above-noted method has a tradeoff between complexity and detection performance according to sizes of the blocks divided from the single frame, the detection performance is steeply worsened when the channels are varied quickly.

SUMMARY OF THE INVENTION

It is an advantage of the present invention to provide a MIMO adaptive receiving system and method for reducing complexity compared to the existing V-BLAST scheme, by optimally deciding filter tap coefficients of the equalizer and symbol detecting order in the time-varying channel environment.

To achieve the advantage, the symbol detecting order for the equalizer are determined based on the RLS algorithm, and the filter tap coefficient vectors of the equalizer are updated depending on the detecting order.

In one aspect of the present invention, an adaptive receiving MIMO system for transmitting and receiving transmit and receive symbol vectors through channels between multiple transmit and receive antennas, comprises:

a linear equalizer for canceling interference added when passed through the channel from the receive symbol vectors and extracting transmit symbol vectors by performing an initial detection;

a plurality of parallel decision feedback equalizers for canceling signal interference from the signals detected by the linear equalizer and the receive symbol vectors according to a filter tap coefficient and a symbol detecting order updated for each predetermined period, and detecting the transmit symbol vectors; and an adaptive block for deciding the symbol detecting order of the linear equalizer and the parallel decision feedback equalizers, and updating the filter tap coefficients based on the RLS (recursive least square) algorithm according to the decided symbol detecting order.

The adaptive receiving system further comprises a reordering unit for reordering the signals sequentially detected through the equalizer according to the symbol detecting order on a plurality of receive symbol vectors decided by the adaptive block.

The linear equalizer comprises: a feedforward filter for receiving the first receive symbol vector from among the receive symbol vectors received through the receive antennas, and filtering error signals; and a decision unit for applying the optimal filter tap coefficient to signals output by the feedforward filter according to a predetermined decision reference, and outputting a decision value.

The parallel decision feedback equalizer comprises:

a feedforward filter for receiving the receive symbol vector from the receive antennas, and performing filtering by using a feedforward filter tap coefficient decided by the adaptive block;

a feedback filter for receiving detected signals from among the receive symbol vectors, and performing filtering by using a feedback filter tap coefficient decided by the adaptive block;

an adder for adding the respective signals output by the feedforward filter and the feedback filter, and outputting added values; and a decision unit for applying the optimal filter tap coefficient to the added values output by the adder according to a predetermined decision reference, and outputting decision values.

The feedback filter increases by an order by one when a detection on the receive symbol vectors from the second symbol to the last symbol is repeated.

The adaptive block defines the reference for deciding the tap coefficient by errors of between the transmit symbol vector transmitted by the transmit antennas and the output of the equalizer, and defines the optimal filter tap coefficient as a filter coefficient for minimizing the errors.

In another aspect of the present invention, an adaptive receiving method in an adaptive receiving system for a MIMO for allowing an equalizer to detect transmit symbol vectors when the transmit symbol vectors transmitted from multiple transmit antennas are input as receive symbol vectors through multiple receive antennas, comprises:

(a) the equalizer detecting an error signal by allowing the initial receive symbol vector to be passed through a feedforward filter, and detecting the transmit symbol vectors according to a predetermined decision reference, when the receive symbol vectors are input; and (b) allowing the equalizer to apply an optimal filter tap coefficient to the feedforward filter and a feedback filter, canceling interference from the receive symbol vectors and detected signals according to a predetermined symbol detecting order, and detecting the transmit symbol vectors when (a) is finished.

The step (b) comprises: allowing the feedforward filter and the feedback filter to update the optimal filter tap coefficient based on the RLS algorithm, and deciding the symbol detecting sequence on the equalizer so that a symbol for minimizing the summation of weights of square errors may be estimated.

The optimal filter tap coefficient is a filter coefficient for minimizing errors between the transmit symbol vector transmitted by the transmit antenna and the estimated transmit symbol vector output by the equalizer.

The optimal filter tap coefficient $w_{t,i}(n)$, i=1, . . . , M is recursively found.

The symbol detecting order $k_i$ of the equalizer is decided to detect the symbol for minimizing the summation of weights of square errors.

The step (a) comprises deciding a value $\hat{d}_{k_i}(n)$ on the first transmit symbol vector by using a value $\hat{d}_{k_i}(n)$ generated when the receive symbol vector $y_{t,i}(n)$ is input to the feedforward filter and is then output therefrom.

The step (b) comprises:

(i) using the cross correlation vector obtained by crossing a first value and a second value to define a cross correlation matrix G(n), the first value being obtained when the receive symbol vector is passed through the feedforward filter, and the second value being obtained when the detected signal is fed back through the feedback filter;

(ii) calculating the optimal filter tap coefficient of $\{v_{1,j}(n),$ j=1, 2, . . . , M\} applied to the feedforward filter and the feedback filter when (i) is finished;

(iii) deciding the symbol detecting order of the equalizer, and updating the filter tap coefficients when (ii) is finished; and (iv) applying the symbol detecting order decided in (iii) and the filter tap coefficient to the next receive symbol vector, detecting the transmit symbol vector, and repeating (iv).

The substep (iii) comprises obtaining the cross correlation vector, calculating the summation of weights of square errors, and deciding the symbol detecting order of each equalizer.

The step (b) comprises deciding the symbol detecting order of the equalizer at intervals of a constant γ.

When inputting the $n^{th}$ receive symbol vector, it comprises:

(i) when 'n' is a multiple of the constant γ, obtaining the cross correlation vector $z_{i,j}(n)$, calculating the summation $\epsilon_{i,j}(n)$ of weights of square errors, and deciding the symbol detecting order $$k_i = \arg\min_j \epsilon_{i,j}(n)$$

of each equalizer; and (ii) when 'n' is not a multiple of the constant γ, updating the filter tap coefficient by use of subsequent equations, and using the previous (n–1) symbol detecting order for the symbol detecting sequence of each equalizer.

The step (b) comprises updating the filter tap coefficient and deciding the symbol detecting order for each symbol time according to the speed of the channel varying during a predetermined period, and deciding the symbol detecting order once with the interval of the constant γ, and updating the filter tap coefficient and maintaining the symbol detecting order during a residual period.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

A MIMO adaptive receiving system according to a preferred embodiment of the present invention will be described in detail with reference to FIG. 1.

Figure 1:
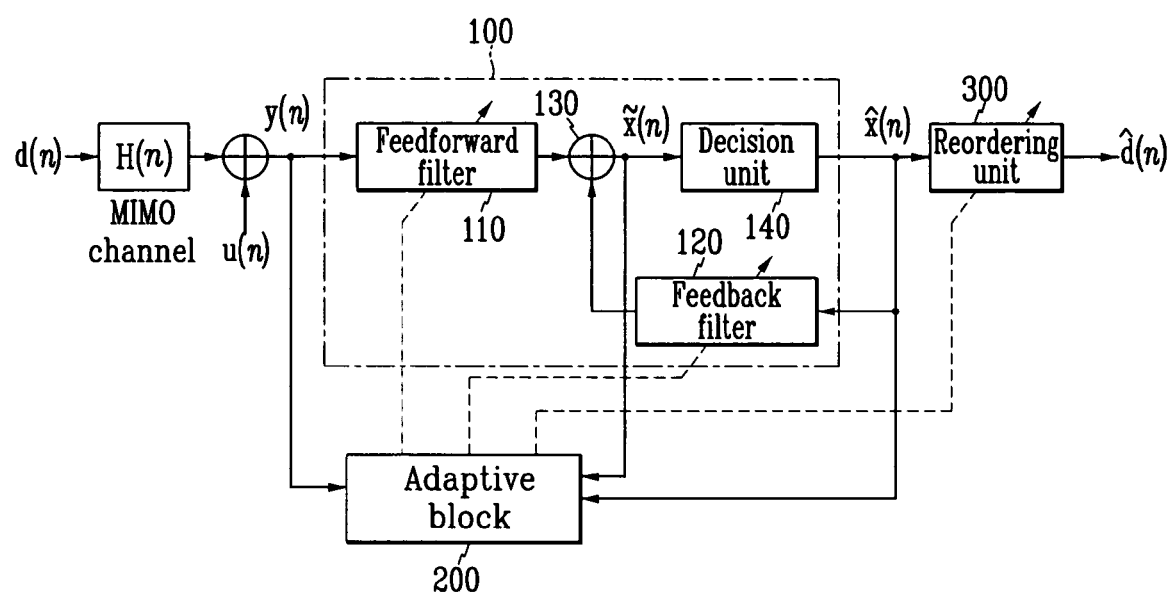
FIG. 1 shows a block diagram of an adaptive receiving system for the MIMO according to a preferred embodiment of the present invention.

FIG. 1 shows a block diagram of an adaptive receiving system for the MIMO according to a preferred embodiment of the present invention.

As shown, the adaptive receiving system comprises an equalizer 100, an adaptive block 200, and a reordering unit 300. The equalizer 100 is classified as a linear equalizer 150, shown in FIG. 2, for detecting the initial transmit symbol vector, and a parallel equalizer for detecting residual transmit symbol vectors.

The equalizer 100 is coupled in parallel by the number of the transmit antennas, and is classified as a linear equalizer and parallel equalizers for ease of description.

The $i^{th}$ equalizer comprises an $N^{th}$-order feedforward filter 110, an $(i-1)^{th}$-order feedback filter 120, an adder 130, and a decision unit 140.

The feedforward filter 110 receives (N×1) receive symbol vectors through N receive antennas and filters error signals, and the feedback filter 120 filters the error signals from the detected signals from among (N×1) receive symbol vectors and feeds results back.

The adder 130 adds respective signals output by the feedforward filter 110 and the feedback filter 120 and outputs an added value, and the decision unit 140 applies the optimal filter tap coefficient to the added value according to a predetermined decision reference and outputs a decision value, that is, a transmit symbol vector.

The adaptive block 200 updates the tap coefficient and the symbol detecting order of the equalizer 100 based on the RLS (recursive least square) algorithm for each symbol, and decides the symbol detecting sequence of the equalizer 100 by using a summation of square errors.

The reordering unit 300 reorders transmit symbol vectors sequentially detected through the equalizer 100 according to a symbol detecting order decided by the adaptive block 200.

The configuration of the adaptive receiving system for the MIMO will now be described.

When using M transmit antennas and N receive antennas, an (M×1) transmit symbol vector $d(n)=[d_1(n), d_2(n), \ldots, d_M(n)]^T$ is transmitted through the transmit antennas, and an (N×1) receive symbol vector $y(n)=[y_1(n), y_2(n), \ldots, y_N(n)]^T$ is received through the receive antennas.

When the transmit symbol vector is passed through an (N×M) channel matrix H(n) caused by channel gains between the respective transmit and receive antennas, and the noise vector $u(n)=[u_1(n), u_2(n), \ldots, u_N(n)]^T$ is added thereto, the receive symbol vector is given as Equation 1.

$$y(n)=H(n)d(n)+u(n) \quad \text{Equation 1}$$

The receive symbol vector is input to the equalizer 100, is passed through the feedforward filter 110 which corresponds to the nulling vector of the V-BLAST scheme, interference is cancelled from the receive symbol vector by using detected signals and the feedback filter 120, and is detected.

The symbol detecting order and the filter tap coefficient vector of the equalizer 100 are updated for each symbol time, and the operation for updating the filter tap coefficient is referred to as a time update.

Figure 2:
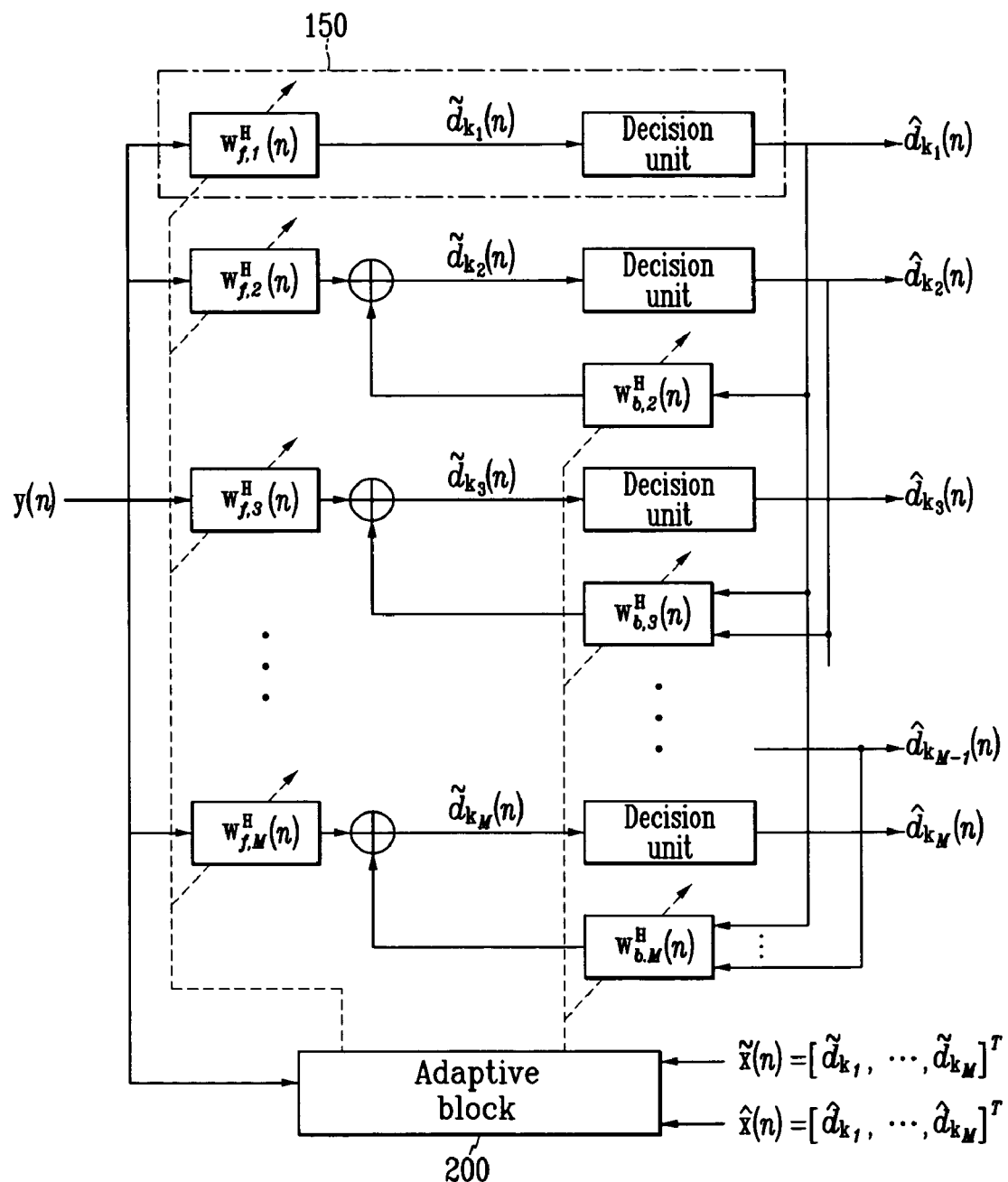
FIG. 2 shows a detailed schematic diagram for an equalizer included in the configuration of FIG. 1.

FIG. 2 shows a detailed schematic diagram for an equalizer included in the configuration of FIG. 1.

As shown, the linear equalizer 150 comprises a feedforward filter 110 and a decision unit 140, and the parallel equalizer 100 comprises a feedforward filter 110, a feedback filter 120, a correlator 130, and a decision unit 140.

The first parallel equalizer provided after the linear equalizer 150 has a first-order feedback filter using a detected $\hat{d}_{k_1}$, the second parallel equalizer has a second-order feedback filter using $\hat{d}_{k_1}$ and $\hat{d}_{k_2}$, and the last equalizer has an $(M-1)^{th}$-order feedback filter.

Referring to FIG. 2, $\{w_{f,i}(n)\}$ is an $N^{th}$-order feedforward filter tap coefficient vector, and $\{w_{h,i}(n)\}$ is an $(i-1)^{th}$ order feedback filter tap coefficient vector.

The concurrently transmitted M transmit symbol vectors are sequentially detected through the equalizer 100, and in further detail, they are detected by the linear equalizer 150 in the first stage, and then are detected by the parallel decision feedback equalizers 100 which increase the order of the feedback filter 120 by one as the detection is repeated.

A set for indicating the symbol detecting order of the transmit symbol vectors d(n) is defined as $S=\{k_1, k_2, \ldots, k_M\}$ where s is a set generated by changing the sequence of elements in $\{1, 2, \ldots, M\}$.

The parallel decision feedback equalizers 100 have a superimposed configuration of equalizers in parallel, the number of the equalizers corresponding to the number of transmit antennas, and the equalizers starting from the top equalizer to the bottom equalizer sequentially detect the transmit symbol vectors according to the symbol detecting order.

The result of detecting the transmit symbol vectors by the decision unit 140, that is, the decision unit is defined to be $\hat{d}(n)=[\hat{d}_{k_1}(n), \hat{d}_{k_1}(n), \ldots, \hat{d}_{k_{i-1}}(n)]^T$.

The adaptive block 200 updates coefficients of the feedforward filter 110 and the feedback filter 120 for each symbol time based on the RLS algorithm, calculates summation of weights of square errors for the respective equalizers 100, and decides the symbol detecting order.

The integrated filter coefficient vector $w_{t,i}(n)$ and the integrated input signal vector $y_{t,i}(n)$ are defined in Equations 2 and 3.

$$w_{t,i}(n) = \begin{cases} w_{f,i}(n), & i=1 \\ [w_{f,i}^T(n), w_{b,i}^T(n)]^T, & i=2, \ldots, M \end{cases} \quad \text{Equation 2}$$

$$y_{t,i}(n) = \begin{cases} y(n), & i=1 \\ [y^T(n), \hat{d}_{k_1}, \ldots, \hat{d}_{k_{i-1}}]^T, & i=2, \ldots, M \end{cases} \quad \text{Equation 3}$$

An operation of the MIMO adaptive receiving system according to the preferred embodiment of the present invention will be described with reference to a drawing.

Figure 3:
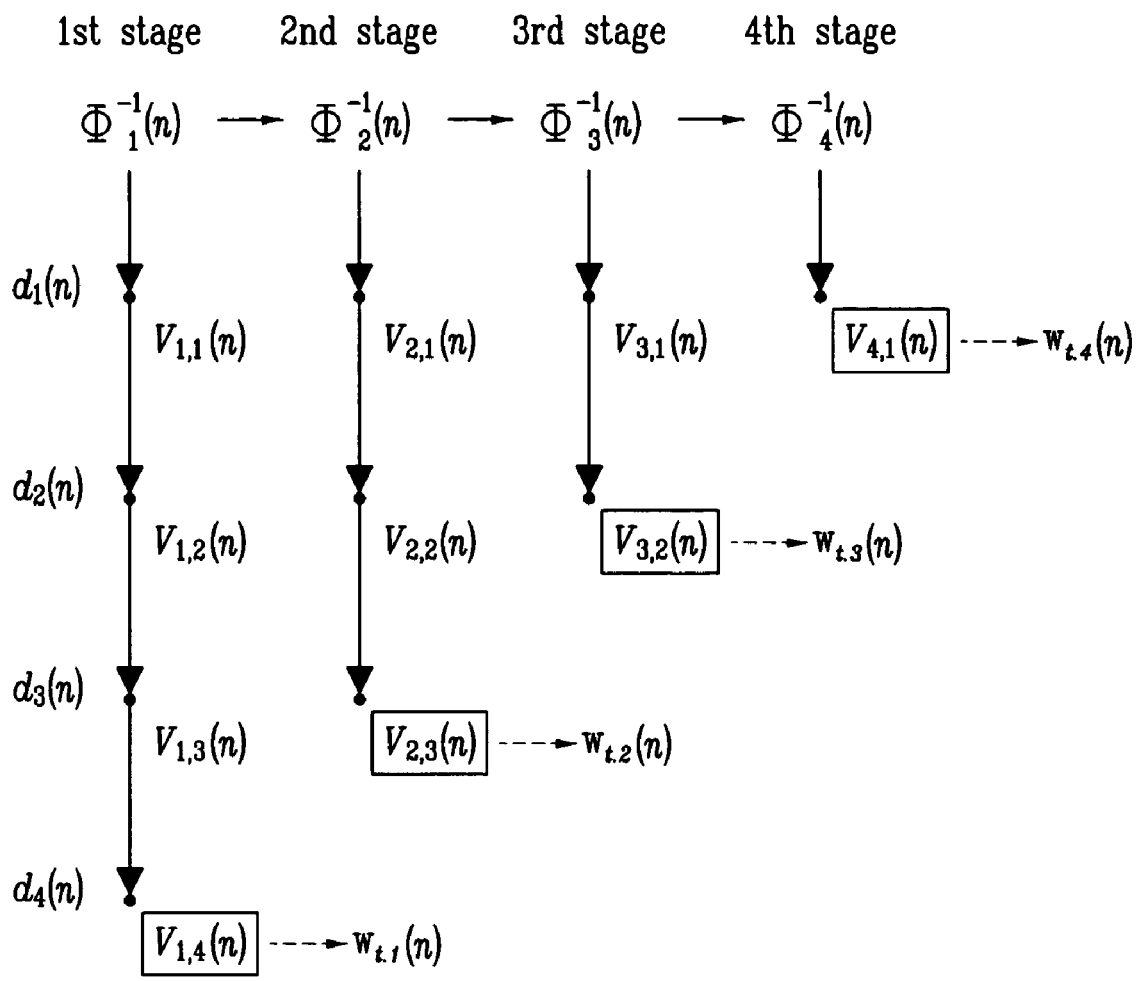
FIG. 3 shows a process for updating optimal filter tap coefficients in an adaptive receiving method for the MIMO according to a preferred embodiment of the present invention.

FIG. 3 shows a process for updating optimal filter tap coefficients in an adaptive receiving method for the MIMO according to a preferred embodiment of the present invention.

As shown, it is required to find the optimal filter tap coefficient of the equalizer 100 when the M transmit symbol vectors are input in the adaptive receiving method for the MIMO.

For this, the adaptive block 200 defines a decision reference as an error of between the transmit symbol vector transmitted from the transmit antenna and the equalizer output of the receiver, and defines the filter coefficient for minimizing the error as the optimal filter tap coefficient.

To define the optimal filter tap coefficient, the outputs of the $i^{th}$ equalizer is defined as Equation 4, and the cost function is given in Equation 5.

$$\hat{d}_{k_i}(n)=w_{t,i}^H(n-1)y_{t,i}(n) \quad \text{Equation 4}$$

$$J_i(n) = \sum_{l=1}^{n} \lambda^{n-l} |\hat{d}_{k_i}(l) - w_{t,i}^H(l)y_{t,i}(l)|^2 \quad \text{Equation 5}$$

The optimal filter tap coefficient for minimizing $J_i(n)$ is given as Equation 6.

$$w_{t,i}(n)=\Phi_i^{-1}(n)z_{i,k_i}(n) \quad \text{Equation 6}$$

where $\Phi_i(n)$ is an autocorrelation matrix, and $z_{i,k_i}(n)$ is a cross correlation vector, respectively given as Equations 7 and 8.

$$\Phi_i(n) = \sum_{l=1}^{n} \lambda^{n-l} y_{t,i}(l) y_{t,i}^H(l) \qquad \text{Equation 7}$$

$$z_{i,j}(n) = \sum_{l=1}^{n} \lambda^{n-l} y_{t,i}(l) \hat{d}_j^*(l) \qquad \text{Equation 8}$$

The optimal filter tap coefficient is found recursively by using the RLS algorithm as given in Equation 9.

$$q_i(n) = \Phi_i^{-1}(n-1) y_{t,i}(n) \qquad \text{Equation 9}$$

$$k_i(n) = \frac{\lambda^{-1} q_i(n)}{1 + \lambda^{-1} y_{t,i}^H(n) q_i(n)}$$

$$\Phi_i^{-1}(n) = \lambda^{-1} \Phi_i^{-1}(n-1) - \lambda^{-1} k_i(n) q_i^H(n)$$

$$w_{t,i}(n) = w_{t,i}(n-1) + k_i(n) \xi_i^*(n)$$

where $\xi_i(n)$ is an a priori estimation error which is given in Equation 10.

$$\xi_i(n) = \hat{d}_{k_i}(n) - w_{t,i}^H(n-1) y_{t,i}(n) \qquad \text{Equation 10}$$

A large amount of calculation of the optimal filter tap coefficient using the RLS algorithm is needed since the RLS algorithm is independently applied to the M equalizer filter tap coefficients $w_{t,i}(n)$, $i=1, \ldots, M$.

When the autocorrelation matrix $\Phi_{i+1}(n)$ is defined as Equation 11, $\Phi_2^{-1}(n), \ldots, \Phi_M^{-1}(n)$ are recursively calculated by using the autocorrelation matrix through Equation 12.

$$\Phi_{i+1}(n) = \begin{bmatrix} \Phi_i(n) & z_{i,k_i}(n) \\ z_{i,k_i}^H(n) & a_{k_i}(n) \end{bmatrix} \qquad \text{Equation 11}$$

$$\Phi_{i+1}^{-1}(n) = \begin{bmatrix} \Phi_i^{-1}(n) + c_i(n) w_{t,i}(n) w_{t,i}^H & -c_i(n) w_{t,i}(n) \\ -c_i(n) w_{t,i}^H(n) & c_i(n) \end{bmatrix} \qquad \text{Equation 12}$$

where it is given that $\alpha_j$ $$\alpha_j(n) = \sum_{l=1}^{n} \lambda^{n-l} |\hat{d}_j(l)|^2 \text{ in Equation 11, and}$$

$$c_i(n) = \frac{1}{\alpha_{k_i}(n) - z_{i,k_i}^H(n) w_{t,i}(n)} \text{ in Equation 12.}$$

Since it is given that $y_{t,i+1}(n) = [y_{t,i}^T(n), \hat{d}_{k_i}(n)]^T$ from Equations 11 and 12, $q_{i+1}(n)$ is recursively calculated as expressed in Equation 13 when substituting Equation 12 and an expansion of $y_{t,i+1}(n)$ for $q_i(n)$ of Equation 9. Here, note that $q_1(n) = \Phi_1^{-1}(n-1) y(n)$.

$$q_{i+1}(n) = \begin{bmatrix} q_i(n) \\ 0 \end{bmatrix} + c_i(n-1) \xi_i(n) \begin{bmatrix} -w_{t,i}(n-1) \\ 1 \end{bmatrix} \qquad \text{Equation 13}$$

Equation 13 is applicable when the symbol detecting order is known.

The symbol detecting order is to be decided after the optimal filter coefficient of the equalizer is calculated.

In general, it is known as the symbol detecting sequence of minimizing the symbol error probability in the V-BLAST scheme to detect the signal which has the largest SNR (signal-to-noise ratio) in each stage. An equivalent SNR is found by using the summation of weights of square errors given as Equation 14 in the RLS algorithm.

$$\varepsilon_{i,j}(n) = \sum_{l=1}^{n} \lambda^{n-l} |d_j(l) - w_{t,i}^H(l) y_{t,i}(l)|^2 \qquad \text{Equation 14}$$

The equalizer 100 detects the symbol which minimizes the summation of weights of square errors given as Equation 14 in each detecting stage as given in Equation 15.

$$k_i = \arg\min_{j} \varepsilon_{i,j}(n) \qquad \text{Equation 15}$$

When it is defined that $v_{i,j}(n) = \Phi_i^{-1}(n) z_{i,j}(n)$, $v_{i,j}$ corresponds to Equation 6 considering that $k_i$ is changed to j in $w_{i,j}(n)$ of Equation 6. The summation of the square error is given as Equation 16.

$$\varepsilon_{i,j}(n) = \alpha_j(n) - v_{i,j}^H(n) z_{i,j}(n) \qquad \text{Equation 16}$$

For example, when the number of transmit antennas is four, and the symbol detecting sequence at the receiver is given as S={4, 3, 2, 1}, $\Phi_i^{-1}$ is recursively found using Equation 12, the optimal symbol detecting sequence is decided using Equation 15, and the optimal filter tap coefficient $v_{i,j}(n)$ is found as shown in FIG. 3.

Figure 4:
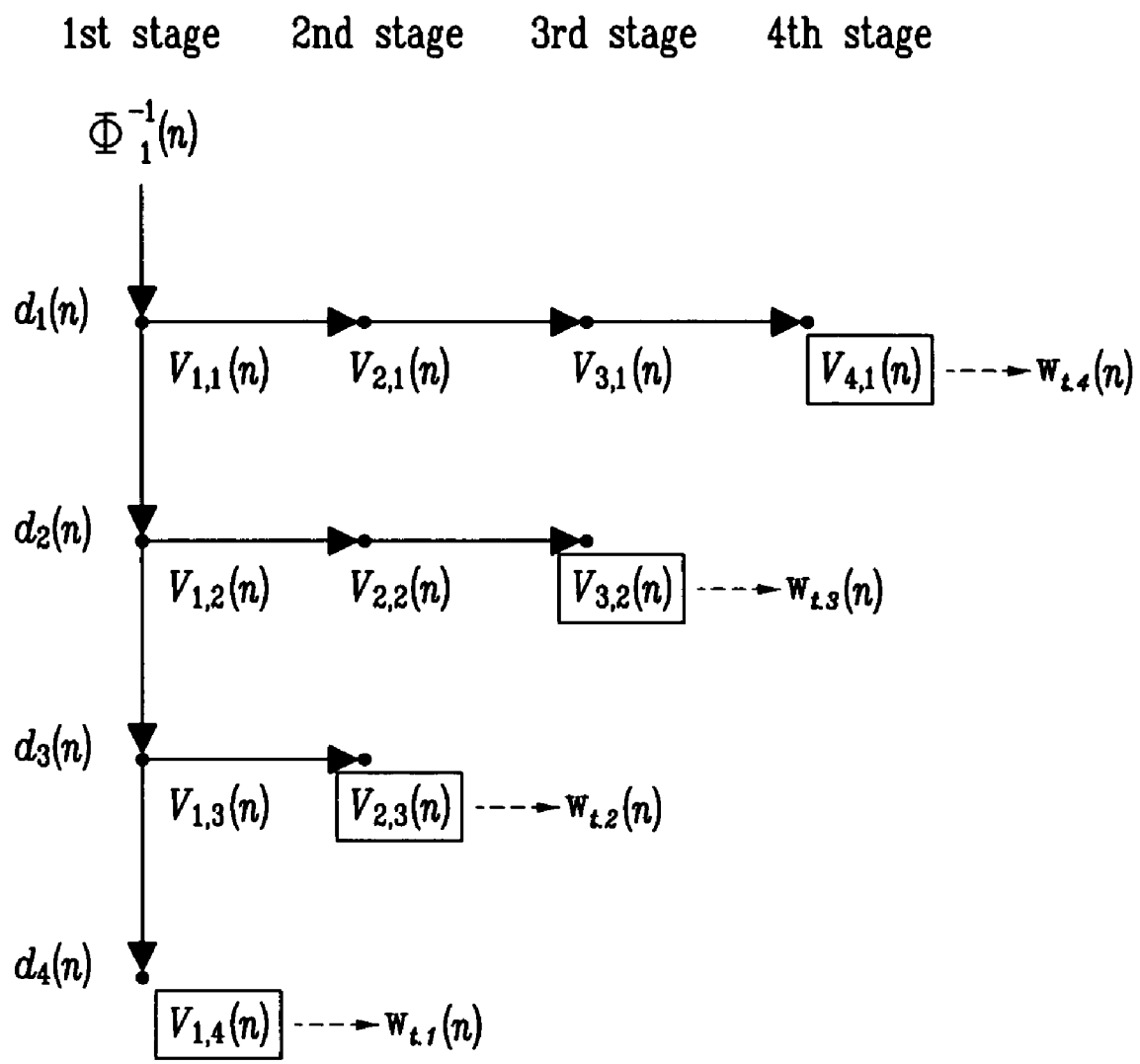
FIG. 4 shows a simplified process for updating optimal filter tap coefficients compared to FIG. 3.

FIG. 4 shows a simplified process for updating the optimal filter tap coefficient compared to FIG. 3.

The method for updating the optimal filter tap coefficient shown in FIG. 4 proposes a method for finding $v_{i,j}(n)$ without updating $\Phi_i^{-1}$ since the method for updating the optimal filter tap coefficient shown in FIG. 3 requires a relatively large amount of calculation for recursively finding $\Phi_i^{-1}$ and $v_{i,j}(n)$.

Assuming that the calculation on $v_{i,j}(n) = \Phi_i^{-1}(n) z_{i,j}(n)$ is finished, $z_{i,j}(n)$ is defined as Equation 17 since Equation 12 for calculating $\Phi_{i+1}^{-1}$ and an update equation of $z_{i+1,j}(n)$ are needed to calculate $v_{i+1,j}(n) = \Phi_{i+1}^{-1}(n) z_{i+1,j}(n)$.

$$z_{i,j}(n) = [g_{1,j}(n), \ldots, g_{N,j}(n), g_{N+k_1,j}(n), \ldots, g_{N+k_{i-1},j}(n)]^T \qquad \text{Equation 17}$$

Noting that $g_{i,j}(n) =$ $$\begin{cases} \sum_{l=1}^{n} \lambda^{n-l} y_i(n) d_j^*(n), & 1 \le i \le N \\ \sum_{l=1}^{n} \lambda^{n-l} d_{i-N}(n) d_j^*(n), & N+1 \le i \le N+M \end{cases},$$

$z_{i+1,j}(n)$ can be given as an update equation of Equation 18.

$$z_{i+1,j}(n) = [z_{i,j}^T(n), g_{N+k_i,j}(n)]^T \qquad \text{Equation 18}$$

Since $\alpha_j(n)$ corresponds to $g_{N+j,j}(n)$, the summation of square error can be given as Equation 19.

$$\epsilon_{i,j}(n) = g_{N+j,j}(n) - v_{i,j}^H(n) z_{i,j}(n) \qquad \text{Equation 19}$$

Also, an (N+M)×N cross correlation matrix is defined in Equation 20 by using Equation 8 which has defined $z_{i,j}(n)$.

$$G(n) = \sum_{l=1}^{n} \lambda^{n-l} \left[ y^T(n), \hat{d}^T(n) \right]^T \hat{d}^H(n) \quad \text{Equation 20}$$

Noting from Equation 20 that $g_{i,j}(n)$ is the $(i,j)^{th}$ element of $G(n)$, $z_{i,j}(n)$ in Equation 18 is obtained through $G(n)$. In addition, a detected transmit symbol vector $\hat{d}(n)$ is required so as to obtain $G(n)$.

The above-noted (n−1) filter tap coefficient and the symbol detecting order are used as shown in Equations 21 and 22 for the transmit symbol vector $\hat{d}(n)$.

$$\tilde{d}_{k_i}(n) = w_{t,i}^H(n-1) y_{t,i}(n) \quad \text{Equation 21}$$

$$\hat{d}_{k_i}(n) = \text{decision}\{\tilde{d}_{k_i}(n)\} \quad \text{Equation 22}$$

When $G(n)$ is given, Equations 12 and 18 are used to recursively find $v_{i+1,j}(n)$ as Equation 23.

$$v_{i+1,j}(n) = \Phi_{i+1}^{-1}(n) z_{i+1,j}(n) \quad \text{Equation 23}$$

$$= \begin{bmatrix} v_{i,j}(n) \\ 0 \end{bmatrix} + \frac{g_{N+k_i,j}(n) - w_{t,i}^H(n) z_{i,j}(n)}{\varepsilon_{i,k_i}(n)} \begin{bmatrix} -w_{t,i}(n) \\ 1 \end{bmatrix}$$

In Equation 23, note that $j \in S_{i+1} = S_i - \{k_i\}, S_1 = \{1, \ldots, M\}$, and $v_{1,j}(n) = \Phi_1^{-1}(n) z_{1,j}(n)$, $j=1,2,\ldots,M$ is calculated according to the existing method.

The detecting process on the adaptive receiving method for the MIMO is summarized as follows.

<Algorithm 1>

In the first stage, all the parameters are initialized so as to start the detection.

n=1

$k_i = i$, for all $i$ $\Phi_1^{-1}(0) = \delta^{-1} I$, $G(0) = 0$ $w_{f,i}(0)=1$, $w_{b,i}(0)=0$, $v_{1,i}(0)=0$, for all $i$ where $\delta$ is a small positive constant.

In the second stage, the receive symbol vector input through a receive antenna is output through the feedforward filter 110 and the feedback filter 120, and the decision unit 140 outputs a decision value, that is, a transmit symbol vector where $i=1, 2, \ldots, M$.

$\tilde{d}_{k_i}(n) = w_{t,i}^H(n-1) y_{t,i}(n)$ $\hat{d}_{k_i}(n) = \text{decision}\{\tilde{d}_{k_i}(n)\}$ $y_{t,i+1}(n) = [y^T(n), \hat{d}_{k_1}(n), \ldots, \hat{d}_{k_i}(n)]^T$ In the third stage, the adder 130 uses output values of the feedforward filter 110 and the feedback filter 120 to update the cross correlation matrix.

$G(n) = \lambda G(n-1) + [y^T(n), \hat{d}^T(n)]^T \hat{d}^H(n)$

In the fourth stage, the adaptive block 200 updates the filter tap coefficient and the detecting order for each symbol time.

(I) Calculation of $\{v_{1,j}(n), j=1, 2, \ldots, M\}$ by using a time-update of filter tap coefficients $q_1(n) = \Phi_1^{-1}(n-1) y(n)$ $$k_1(n) = \frac{\lambda^{-1} q_1(n)}{1 + \lambda^{-1} y^H(n) q_1(n)}$$

$\Phi_1^{-1}(n) = \lambda^{-1} \Phi_1^{-1}(n-1) - \lambda^{-1} k_1(n) q_1^H(n)$ $v_{1,j}(n) = v_{1,j}(n-1) + k_1(n)(d_j(n) - v_{1,j}^H(n-1) y(n))^*$ (II) Decision of symbol detecting sequences and update of filter tap coefficients i) Obtainment of $z_{i,j}(n) = [g_{1,j}(n), \ldots, g_{N,j}(n), g_{N+k_1,j}(n), \ldots, g_{N+k_{i-1},j}(n)]^T$ ii) Calculation of the summation of the square errors $$\varepsilon_{i,j}(n) = g_{N+j,i}(n) - v_{i,j}^H(n) z_{i,j}(n)$$

iii) Decision of the symbol detecting sequence $$k_i = \arg\min_j \varepsilon_{i,j}(n).$$

$w_{t,i}(n) = v_{i,k_i}(n)$ $$v_{i+1,j}(n) = \begin{bmatrix} v_{i,j}(n) \\ 0 \end{bmatrix} + \frac{g_{N+k_i,j}(n) - w_{t,i}^H(n) z_{i,j}(n)}{\varepsilon_{i,k_i}(n)} \begin{bmatrix} -w_{t,i}(n) \\ 1 \end{bmatrix}$$

In the fifth stage (n=n+1), the stages starting from the second stage are repeated until all the detections on the M transmit symbol vectors transmitted from the transmit antenna are finished.

In algorithm 1, the second stage can be omitted since previously known data are transmitted during the initial period. When the terminal moves slowly and the channel is varying slowly, it frequently occurs that the symbol detecting order is not changed for each symbol time, and the symbol detecting order used during detecting $d(n-1)$ is not varied while detecting $d(n)$.

In algorithm 2, a constant $\gamma$ is defined, the symbol detecting order is established for each time with the interval of $\gamma$, and the predefined symbol detecting order is maintained in another time without updating the symbol detecting order for each symbol time as shown in algorithm 1.

<Algorithm 2>

Similar to algorithm 1, but (II) of the fourth stage is modified as below.

In (II) for updating the filter tap coefficients of the fourth stage, (II) is performed when 'n' is a multiple of $\gamma$, and $w_{t,i}(n)$ is calculated by using Equation 24 when 'n' is not a multiple of $\gamma$.

$$q_1(n) = \Phi_1^{-1}(n-1) y(n) \quad \text{Equation 24}$$

$$q_{i+1}(n) = \begin{bmatrix} q_i(n) \\ 0 \end{bmatrix} + c_i(n-1) \xi_i(n) \begin{bmatrix} -w_{t,i}(n-1) \\ 1 \end{bmatrix}$$

-continued $$k_i(n) = \frac{\lambda^{-1} q_i(n)}{1 + \lambda^{-1} y_{t,i}^H(n) q_i(n)}$$

$$w_{t,i}(n) = w_{t,i}(n-1) + k_i(n)(\hat{d}_{k_i}(n) - w_{t,i}^H(n-1) y_{t,i}(n))^*$$

It will be described that how much of the amount of calculation in the adaptive receiving system and method for the MIMO according to the preferred embodiment of the present invention is reduced in the time-varying channel environment compared to the existing V-BLAST method.

It is assumed that the V-BLAST method uses the method of "Modified Decorrelating Decision-Feedback Detection of BLAST Space-Time System," in Proc. ICC 2002 by Wei Zha and Steven D. Blostein which provides simple calculation, and channel estimation results are tracked by using the conventional RLS method.

Assuming that the number of transmit antennas and that of receive antennas are respectively M, the number of times of multiplication and addition of complex numbers is given as follows according to whether the symbol detecting order is varied.

The number of times of multiplication and addition of complex numbers is given as Table 1 when the symbol detecting order is varied while detecting d(n) and d(n+1).

TABLE 1

|  | Multiplication of complex numbers | Addition of complex numbers |
| --- | --- | --- |
| V-BLAST + RLS channel tracking | $\frac{7}{3}M^3$ | $\frac{5}{3}M^3$ |
| Proposed MIMO-DFE | $\frac{4}{3}M^3$ | $\frac{4}{3}M^3$ |

The number of times of multiplication and addition of complex numbers is given as Table 2 when the symbol detecting order is the same while detecting d(n) and d(n+1).

TABLE 2

|  | Multiplication of complex numbers | Addition of complex numbers |
| --- | --- | --- |
| V-BLAST + RLS channel tracking | $\frac{5}{6}M^3 + 5.5 M^2$ | $\frac{5}{6}M^3 + 2 M^2$ |
| Proposed MIMO-DFE | $7.5 M^2$ | $4 M^2$ |

Table 3 shows operations of the multiplication and addition of complex numbers as number values according to the number of antennas, and shows corresponding decrease information.

TABLE 3

|  | Operations | M = N = 4 | M = N = 8 | M = N = 12 |
| --- | --- | --- | --- | --- |
| V-BLAST + RLS channel tracking | Multiplication of complex numbers | 1139 | 6646 | 19656 |
|  | Addition of complex numbers | 704 | 4736 | 14976 |
| V-BLAST + RLS channel tracking | Multiplication of complex numbers | 926 | 4043 | 9864 |
|  | Addition of complex numbers | 534 | 2475 | 6336 |
| Decrease rates | Multiplication of complex numbers | 18.7% | 39.2% | 49.8% |
|  | Addition of complex numbers | 24.2% | 47.7% | 57.5% |

Figure 5:
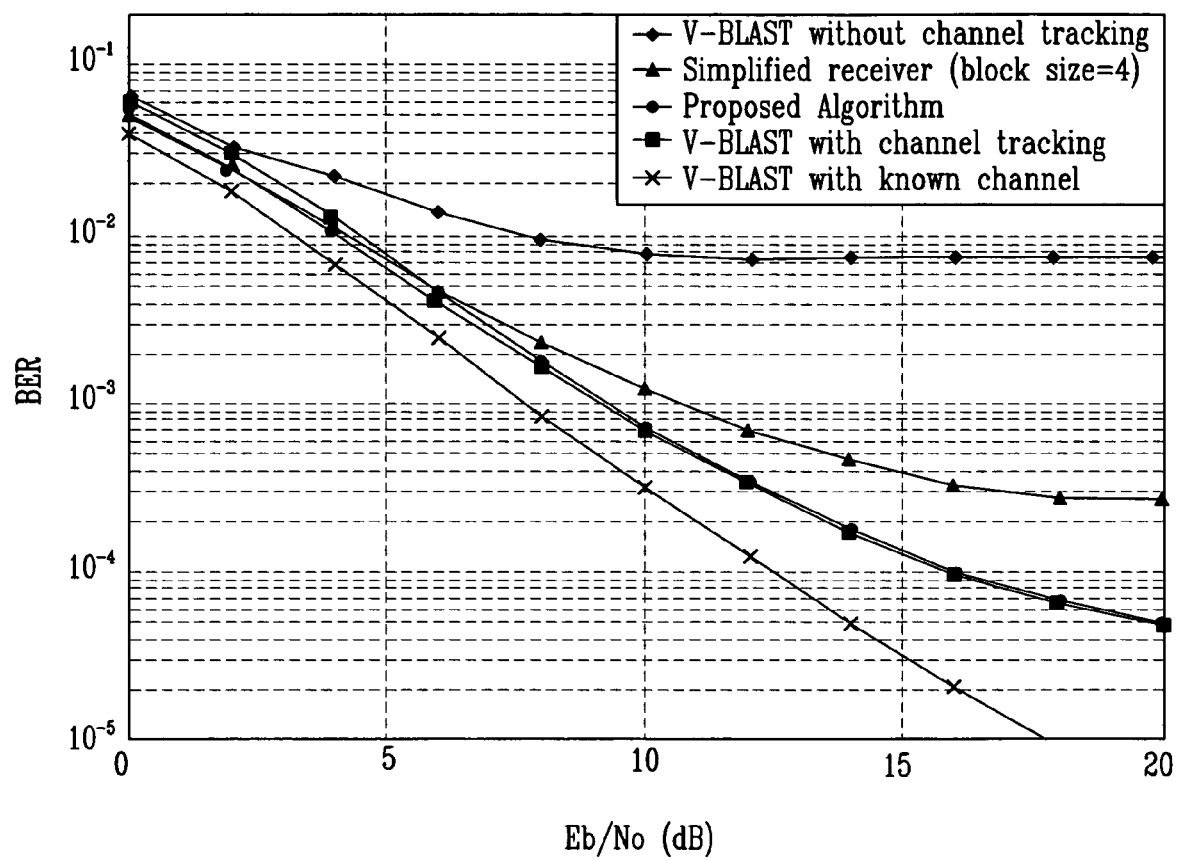
FIGS. 5 to 7 show graphs for comparing BER performance between the preferred embodiment of the present invention and the existing V-BLAST scheme.
Figure 7:
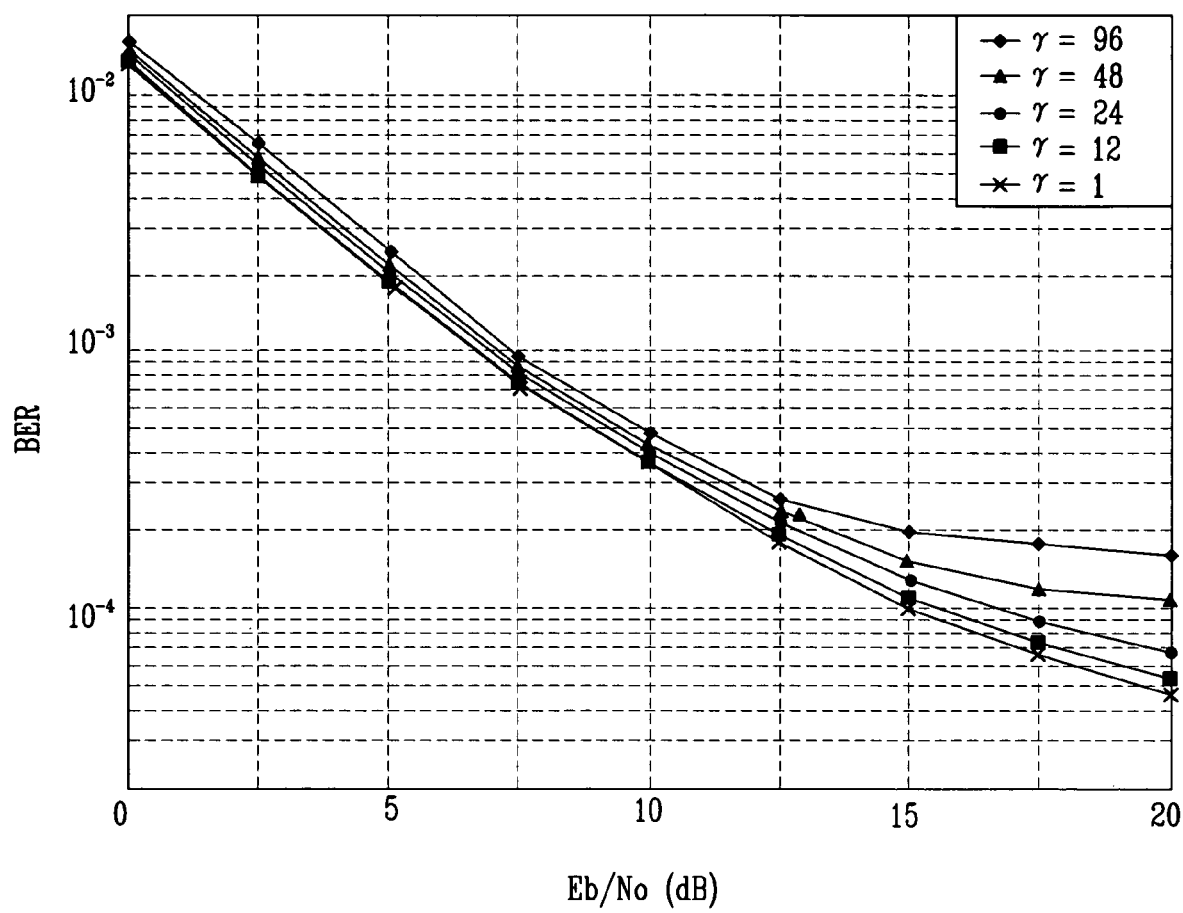

FIGS. 5 and 7 show graphs of performance through simulations according to the MIMO adaptive receiving system and method.

A channel model by W. C. Jakes is used for the simulation, and it is assumed that no correlation is provided between the respective transmit and receive antennas, and the number of transmit and receive antennas is four.

A frame includes 160 transmit symbol vectors, 32 top transmit symbol vectors thereof are allocated to the training period to have the signals of the transmit antennas cross each other, and the signals modulated by the QPSK are transmitted to the receive axis (note that λ=0.95).

FIG. 5 shows a graph on the performance of algorithm 1 when the normalized Doppler frequency which is a product of the Doppler frequency fd and the symbol length T, the Doppler frequency being a barometer for indicating varied degrees of channels.

As shown, algorithm 1 with a simpler amount of calculation shows the same performance as that of the V-BLAST scheme.

When comparing the performance of algorithm 1 with the result of applying the V-BLAST scheme assuming that the channel of the lowest performance is completely known in FIG. 5, the performance is reduced by about 2 dB in the case of BER=10-3.

The method for inserting a mid-amble by the ratio of 1/4, and tracking the channel by blocks produces performance lower than that of the preferred embodiment.

Figure 6:
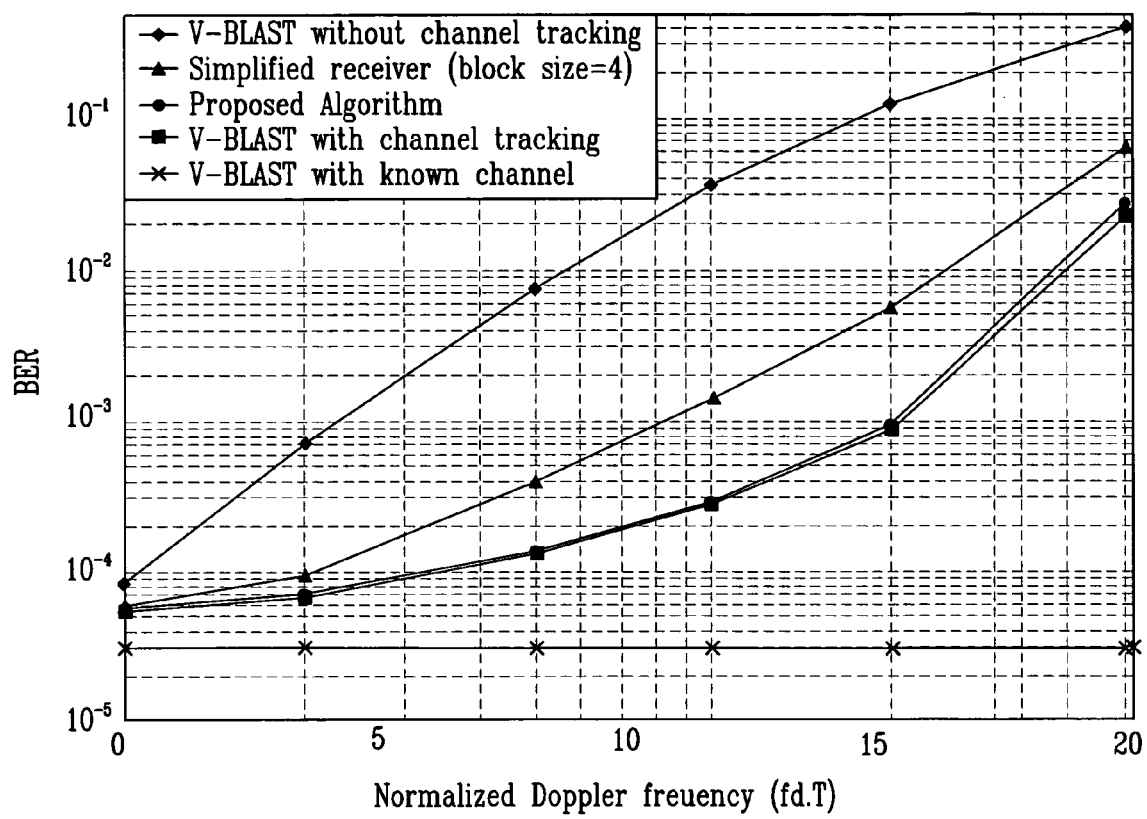

FIG. 6 shows performance variations depending on fdT when the ratio of bit power and noise power, which indicating that the above-described trend is not varied when the degrees of channel variation is changed.

FIG. 7 shows performance of algorithm 2 according to the preferred embodiment of the present invention.

As shown, the simulation environment by algorithm 2 corresponds to that of FIG. 5, and the symbol detecting sequence follows variations of the update period γ. The performance is lowered by less than about 1 dB when γ is 12 or 24 in the environment that $f_d T$ is 0.0005.

As described, the MIMO adaptive receiving system and method decides the optimal filter tap coefficients and the symbol detecting order in the time-varying channel environment to reduce complexity, provide easy realization, and produce similar performance compared to the conventional V-BLAST scheme, and further, it is applicable to other types of MIMO receivers.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An adaptive receiving MIMO (multi input and multi output) system for transmitting and receiving transmit and receive symbol vectors through channels between multiple transmit and receive antennas, comprising:

a linear equalizer for canceling interference added when passed through the channel from the receive symbol vectors and extracting transmit symbol vectors by performing an initial detection;

a plurality of parallel decision feedback equalizers for canceling signal interference from the signals detected by the linear equalizer and the receive symbol vectors according to a filter tap coefficient and a symbol detecting order updated for each predetermined period, and detecting the transmit symbol vectors, wherein a cross correlation vector is obtained by crossing a first value and a second value to define a cross correlation matrix, the first value obtained when the receive symbol vector is passed through the feedforward filter, and the second value obtained when the detected signal is fed back through the feedback filter; and an adaptive block for deciding the symbol detecting orders of the linear equalizer and the parallel decision feedback equalizers, and updating the filter tap coefficients based on the RLS (recursive least square) algorithm according to the decided symbol detecting orders.

2. The adaptive receiving system of claim 1, further comprising a reordering unit for reordering the signals sequentially detected through the equalizer according to the symbol detecting order on a plurality of receive symbol vectors decided by the adaptive block.

3. The adaptive receiving system of claim 1, wherein the linear equalizer comprises:

a feedforward filter for receiving the first receive symbol vector from among the receive symbol vectors received through the receive antennas, and filtering error signals; and a decision unit for applying the optimal filter tap coefficient to signals output by the feedforward filter according to a predetermined decision reference, and outputting a decision value.

4. The adaptive receiving system of claim 1, wherein the parallel decision feedback equalizer comprises:

a feedforward filter for receiving the receive symbol vector from the receive antennas, and performing filtering by using a feedforward filter tap coefficient decided by the adaptive block;

a feedback filter for receiving detected signals from among the receive symbol vectors, and performing filtering by using a feedback filter tap coefficient decided by the adaptive block;

an adder for adding the respective signals output by the feedforward filter and the feedback filter, and outputting added values; and a decision unit for applying the optimal filter tap coefficient to the added values output by the adder according to a predetermined decision reference, and outputting decision values.

5. The adaptive receiving system of claim 4, wherein the feedback filter increases by an order by one when a detection on the receive symbol vectors from the second symbol to the last symbol is repeated.

6. The adaptive receiving system of claim 1, wherein the adaptive block defines the reference for deciding the tap coefficient by errors of between the transmit symbol vector transmitted by the transmit antenna and the output of the equalizer, and defines the optimal filter tap coefficient as a filter coefficient for minimizing the errors.

7. An adaptive receiving method in an adaptive receiving system for a MIMO (multi input and multi output) for allowing an equalizer to detect transmit symbol vectors when the transmit symbol vectors transmitted from multiple transmit antennas are input as receive symbol vectors through multiple receive antennas, comprising:

(a) the equalizer detecting an error signal by allowing the initial receive symbol vector to be passed through a feedforward filter, and detecting the transmit symbol vectors according to a predetermined decision reference, when the receive symbol vectors are input; and (b) allowing the equalizer to apply an optimal filter tap coefficient to the feedforward filter and a feedback filter, canceling interference from the receive symbol vectors and detected signals according to a predetermined symbol detecting order, and detecting the transmit symbol vectors when (a) is finished, and using a cross correlation vector obtained by crossing a first value and a second value to define a cross correlation matrix G(n), the first value being obtained when the receive symbol vector is passed through the feedforward filter, and the second value being obtained when the detected signal is fed back through the feedback filter.

8. The adaptive receiving method of claim 7, wherein (b) comprises: allowing the feedforward filter and the feedback filter to update the optimal filter tap coefficient based on the RLS (recursive least square) algorithm, and deciding the symbol detecting order on the equalizer so that a symbol for minimizing the summation of weights of square errors may be estimated.

9. The adaptive receiving method of claim 8, wherein the optimal filter tap coefficient is a filter coefficient for minimizing error between the transmit symbol vector transmitted by the transmit antenna and the estimated transmit symbol vector output by the equalizer.

10. The adaptive receiving method of claim 8, wherein the optimal filter tap coefficient $w_{t,i}(n)$, $i=1, \ldots, M$ is recursively found by using subsequent equations:

$$q_1(n) = \Phi_i^{-1}(n-1) y_{t,i}(n)$$

$$k_i(n) = \frac{\lambda^{-1} q_i(n)}{1 + \lambda^{-1} y_{t,i}^H(n) q_i(n)}$$

$$\Phi_i^{-1}(n) = \lambda^{-1} \Phi_i^{-1}(n-1) - \lambda^{-1} k_1(n) q_1^H(n)$$

$$w_{t,i}(n) + w_{t,i}(n-1) + k_i(n) \xi_{i*}(n)$$

where $\xi_i(n)$ is an a priori estimation error which is given as $$\xi_i(n) = d_{k_i}(n) - w_{i,t}^H(n-1) y_{t,i}(n)$$

11. The adaptive receiving method of claim 8, wherein the symbol detecting order $k_i$ of the equalizer is decided to detect the symbol for minimizing the summation of weights of square errors:

$$k_i = \underset{j}{\operatorname{argmin}}\, \varepsilon_{i,j}(n) \text{ and } \varepsilon_{i,j}(n) = \sum_{l=1}^{n} \lambda^{n-l} |d_j(l) - w_{t,i}^H(l) y_{t,i}(l)|^2$$

where $w_{t,i}(n)$ is an integrated filter coefficient vector of the equalizer, and $y_{t,i}(n)$ is an integrated input signal vector, and $d(n)$ is a transmit symbol vector.

12. The adaptive receiving method of claim 7, wherein (a) comprises deciding a value $\hat{d}(n)$ on the first transmit symbol vector by using a value $\hat{d}_{k_1}(n)$ generated when the receive symbol vector $y_{t,i}(n)$ is input to the feedforward filter and is then output therefrom:

$\tilde{d}_{k_1}(n) = w_{1,t}^H(n-1)y_{t,i}(n)$ $\hat{d}_{k_1}(n) = \text{decision}\{\tilde{d}_{k_1}(n)\}$ $y_{t,i+1}(n) = [y^t(n), \hat{d}_{k_1}(n), \ldots, \hat{d}_{k_1}(n)]^t$ 13. The adaptive receiving method of claim 7, wherein (b) comprises:

(i) the cross correlation vector is obtained by an equation:

$G(n) = \lambda G(n-1) + [y^T(n), \hat{d}(n)]^T \hat{d}^H(n);$ (ii) calculating the optimal filter tap coefficient of $\{v_{1,j}(n), j=1,2,\ldots,M\}$ applied to the feedforward filter and the feedback filter when (i) is finished;

$q_1(n) = \Phi_1^{-1}(n-1)y(n)$ $k_1(n) = \dfrac{\lambda^{-1} q_1(n)}{1 + \lambda^{-1} y^H(n) q_1(n)}$ $\Phi_i^{-1}(n) = \lambda^{-1}\Phi_i^{-1}(n-1) - \lambda^{-1}k_1(n)q_i^H(n)$ $v_{1,i}(n) = v_{1,i}(n-1) + k_1(n)(d_i(n) - v_{1,i}^H(n-1)y(n))$ (iii) deciding the symbol detecting orders of the equalizer, and updating the filter tap coefficients when (ii) is finished; and (iv) applying the symbol detecting order decided in (iii) and the filter tap coefficient to the next receive symbol vector, detecting the transmit symbol vector, and repeating (iv).

14. The adaptive receiving method of claim 13, wherein (iii) comprises obtaining the cross correlation vector $z_{i,j}(n)$, calculating the summation $\epsilon_{i,j}(n)$ of weights of square errors, and deciding the symbol detecting order 30

$k_1 = \underset{j}{\text{argmin}}\,\epsilon_{i,j}(n)$ of each equalizer:

$z_{i,j}(n) = [g_{1,j}(n), \ldots g_{N,j}(n), g_{N+k,j}(n)]^T$ $\epsilon_{i,j}(n) = g_{N+J,J}(n)z_{i,j}(n)$ $w_{1,i}(n) = v_{i,k_1}(n)$ $v_{i+1,j}(n) = \begin{bmatrix} v_{i,j}(n) \\ 0 \end{bmatrix} + \dfrac{g_{N+k_i,j}(n) - w_{t,i}^H(n)z_{i,j}(n)}{\varepsilon_{i,k_i}(n)} \begin{bmatrix} -w_{t,i}(n) \\ 1 \end{bmatrix}$ where $w_{t,i}(n)$ is an integrated filter tap coefficient.

15. The adaptive receiving method of claim 7, wherein (b) comprises deciding the symbol detecting order of the equalizer at intervals of a constant $\gamma$.

16. The adaptive receiving method of claim 15, wherein when inputting the $n^{th}$ receive symbol vector, (i) when 'n' is a multiple of the constant y, obtaining the cross correlation vector $z_{i,j}(n)$, calculating the summation $\epsilon_{i,j}(n)$ of weights of square errors, and deciding the symbol detecting order 30

$k_1 = \underset{j}{\text{argmin}}\,\epsilon_{i,j}(n)$ of each equalizer:

$z_{i,j}(n) = [g_{1,j}(n), \ldots g_{N,j}(n), g_{N+k,j}(n_n)]^T$ $\epsilon_{i,j}(n) = g_{N+J,J}(n)z_{i,j}(n)$ $w_{1,i}(n) = v_{i,k_1}(n)$ $v_{i+1,j}(n) = \begin{bmatrix} v_{i,j}(n) \\ 0 \end{bmatrix} + \dfrac{g_{N+k_i,j}(n) - w_{t,i}^H(n)z_{i,j}(n)}{\varepsilon_{i,k_i}(n)} \begin{bmatrix} -w_{t,i}(n) \\ 1 \end{bmatrix}$ where $w_{t,i}(n)$ is an integrated filter tap coefficient; (ii) when 'n' is not a multiple of the constant $\gamma$, updating the filter tap coefficient by use of subsequent equations, and using the previous (n−1) symbol detecting order for the symbol detecting order of each equalizer:

$q_1(n) = \Phi_1^{-1}(n-1)y(n)$ $q_{i+1}(n) = \begin{bmatrix} q_i(n) \\ 0 \end{bmatrix} + c_i(n-1)\xi_i(n)\begin{bmatrix} -w_{t,i}(n-1) \\ 1 \end{bmatrix}$ $k_i(n) = \dfrac{\lambda^{-1} q_i(n)}{1 + \lambda^{-1} y_{t,i}^H(n) q_i(n)}$ $w_{t,j}(n) = w_{t,j}(n-1) + k_1(n)(\hat{d}_{k_1}(n) - w_{t,j}^H(n-1)y_{t,j}(n))$ 17. The adaptive receiving method of claim 7, wherein (b) comprises updating the filter tap coefficient and deciding the symbol detecting order for each symbol time according to the speed of the channel varying during a predetermined period, and deciding the symbol detecting order once with the interval of the constant $\gamma$, and updating the filter tap coefficient and maintaining the symbol detecting order during a residual period.

* * * * *